(12) United States Patent
Kaefer et al.

(10) Patent No.: US 7,770,383 B2
(45) Date of Patent: Aug. 10, 2010

(54) DEVICE AND METHOD FOR DOSING AND TRANSPORTING DRY UREA, ESPECIALLY DURING THE IMPLEMENTATION OF THE SCR METHOD IN MOTOR VEHICLES

(75) Inventors: Sebastian Kaefer, Kaiserslautern (DE); Werner Mueller, Kaiserslautern (DE); Andreas Herr, Kaiserslautern (DE); Andreas Lacroix, Weidenthal (DE)

(73) Assignee: Volkswagen AG, Wolfsburg (DE)

( * ) Notice: Subject to any disclaimer, the term of this patent is extended or adjusted under 35 U.S.C. 154(b) by 1371 days.

(21) Appl. No.: 10/533,779

(22) PCT Filed: Oct. 31, 2003

(86) PCT No.: PCT/EP03/12142
§ 371 (c)(1),
(2), (4) Date: Sep. 8, 2005

(87) PCT Pub. No.: WO2004/042209
PCT Pub. Date: May 21, 2004

(65) Prior Publication Data
US 2006/0086079 A1    Apr. 27, 2006

(30) Foreign Application Priority Data
Nov. 4, 2002    (DE)    ................. 102 51 498

(51) Int. Cl.
*F01N 3/00*    (2006.01)
(52) U.S. Cl. .............. 60/286; 60/295; 60/301; 60/303
(58) Field of Classification Search ............ 60/274, 60/286, 301, 303, 295
See application file for complete search history.

(56) References Cited

U.S. PATENT DOCUMENTS

| | | | |
|---|---|---|---|
| 5,584,265 A | 12/1996 | Rao et al. | |
| 5,809,775 A * | 9/1998 | Tarabulski et al. | ............ 60/274 |
| 5,813,224 A * | 9/1998 | Rao et al. | ............ 60/274 |
| 6,301,879 B1 | 10/2001 | Weisweiler et al. | |
| 6,399,034 B1 * | 6/2002 | Weisweiler | ............ 423/213.2 |
| 6,502,390 B2 * | 1/2003 | Goerigk et al. | ............ 60/286 |

FOREIGN PATENT DOCUMENTS

| | | |
|---|---|---|
| DE | 40 38 054 | 6/1992 |
| DE | 196 27 187 | 1/1998 |
| DE | 197 54 135 | 6/1999 |
| EP | 0 615 777 | 9/1994 |

* cited by examiner

*Primary Examiner*—Thomas E Denion
*Assistant Examiner*—Diem Tran
(74) *Attorney, Agent, or Firm*—Kenyon & Kenyon LLP

(57) ABSTRACT

In a device for dosing and transporting dry urea, e.g., for implementing the SCR method in a motor vehicle, the device includes a storage vessel containing the dry urea in the form of pellets, the wall of the storage vessel having an opening to which a transport line is connected on the outer side. The device also includes a compressed air nozzle which is arranged inside the storage vessel at a distance from the opening, is oriented towards the opening, and may be supplied with compressed air, and a portioning element having an upper side oriented towards the inside of the storage vessel and a lower side opposite the wall of the storage vessel. At least one continuous channel having a larger cross section than the dimensions of the pellets connects the upper side and the lower side in order to form at least one receiving element for the pellets.

33 Claims, 3 Drawing Sheets

DEVICE AND METHOD FOR DOSING AND TRANSPORTING DRY UREA, ESPECIALLY DURING THE IMPLEMENTATION OF THE SCR METHOD IN MOTOR VEHICLES

FIELD OF THE INVENTION

The present invention relates to a device and a method for dosing and transporting dry urea.

BACKGROUND INFORMATION

A large increase in population, increased industrialization and rising amounts of traffic lead to a concentration of contaminants in the environmental air that has assumed critical proportions. In this connection, nitrogen oxide emissions are of special importance, and these may be attributed in large measure to the combustion of gasoline fuels and Diesel fuels in automobiles. Nitrogen oxide emissions contribute, among other things, to increased ozone concentrations at ground level.

In order to counter this critical development, and based on repeated tightening of contaminant limiting values by lawmakers, automobile manufacturers have constantly made efforts to decrease nitrogen oxide concentrations that are created during the operation of a motor vehicle. In this context, a possibility is the application of the SCR method, used in industrial installations, in which ammonia is added to the exhaust gas stream. In this context, the ammonia reacts with the nitrogen oxides to form nitrogen, carbon dioxide and water.

Because of the danger potential relating to the ammonia, carrying ammonia along in a motor vehicle may be problematic. Therefore, it may be possible to produce ammonia, in a quantity exactly required for the chemical reaction, from urea.

This possibility is described, for example, in German Published Patent Application No. 40 38 054, in which an aqueous urea solution is carried along in a container in the motor vehicle, and, with the aid of a hydrolysis catalyst, is split into ammonia and carbon dioxide. In practice, however, various problems come about from the use of an aqueous urea solution. Carrying along aqueous urea not only assumes a corresponding space availability for the tank required for this, but also increases the overall weight of the motor vehicle. Additional disadvantages come about with reference to the wintertime suitability of a vehicle, because of the relatively high freezing point of the urea solution. Besides, in the operation of the motor vehicle, the water proportion of the urea solution has to be evaporated, so that this energy is no longer available to increase the reaction temperature. Also, the production of aqueous urea solutions is expensive, since they are made using deionized water so as to avoid deposits.

The use of dry urea for producing ammonia has been considered, which, after it has been brought to a powdery consistency, is transported to the place of application using a carrier air stream. However, the assumption for this is that the urea is in a free-flowing condition. However, this property is greatly impaired if the dry urea is exposed to moisture, high temperatures or mechanical pressure, since then the baking together of the urea particles may occur. Additional problems come about while transporting solid substances by their inclination to form bridges, which may later cause clogging.

For example, European Published Patent Application No. 0 615 777 describes a method and an appertaining device in which urea is supplied from a storage vessel or reservoir, using a precision dosing unit, to a carrier air stream. The precision dosing unit works according to the principle of a feeding screw, a change in dosing being achieved via a change in the rotary speed of the feeding screw. The solid urea is either already present in powder form in the storage vessel or, if bigger particles are being used, is conveyed to a millwork before being transported. In order to prevent the absorption of moisture, it is suggested there that one should pack the urea under the exclusion of humidity of the air, and to open the package only after inserting it into the storage vessel.

The use of loads of urea that are packed in an air-tight manner may be very expensive, since the urea first has to be packed in an air-tight manner, excluding moisture. In addition, the individual packages must not be too large, since in the course of time the urea absorbs moisture, even in the storage vessel, because of its hygroscopic properties. However, smaller urea portions call for frequent refilling of the storage vessel, which is of little convenience to the user of a motor vehicle.

In order to overcome these aspects, German Published Patent Application No. 197 54 135 describes carrying the urea along in a solid monolithic structure. Depending on requirements, using a removing device, the appropriate quantity of urea is continuously removed from a block, if necessary, the urea is finely ground if the particles are still too big, and the powdery urea is then fed to a carrier gas stream for transport. The removing device is a rotating disk or roll fitted with bristles, abrasive grains, knives or milling tools. By changing the advancing speed of the removing device with respect to the urea block, the dosing quantity may be varied.

Using this procedure, the problem of baking together of the particles is solved, however, other problems remain. Thus, the prepreparation of the urea to form monolithic blocks may be necessary, which means a corresponding preliminary expenditure. An additional disadvantage comes about due to the use of the removing device described there. During removal from the urea block, unavoidably urea particles of different sizes may be produced. This has the result that the urea quantity supplied to the system varies as a function of the particles. Exact dosing in accordance with instantaneous requirements, if at all possible, may be done only within wide boundaries.

German Published Patent Application No. 197 54 135 describes using an additional millwork by which the particles removed from the urea block are milled down to a powder. This, however, may have the disadvantage that the conversion of the urea block to powdered urea represents an additional preinserted method step which may negatively influence the reaction time of the overall system, that is, the system may become too inert. Because of that, the requirement for ammonia conditioned upon the load change may not be able to be satisfied in the short run, or, in the short run, an oversupply may be created.

SUMMARY

Based on this background, example embodiments of the present invention may provide a method and a device for dosing and transporting dry urea, which may permit exact dosing of the urea within wide ranges of quantities in a greatly dynamic manner. Reliable transport of the urea to the processing location may also be achieved.

Example embodiments of the present invention are described below.

An example embodiment of the present invention is based on the use of urea, for carrying out the SCR method, in a form that is already available in large quantities. Thus, urea is applied in large volume to agriculturally used areas, e.g., for fertilization. The urea from the fertilizer industry corresponds in its composition, form and dimensions to the requirements hereof, e.g., it is available in the dry state in spherical or sphere-like shape. Such urea is also designated by the technical term pellet. However, within the present context, the term pellet is not limited to a spherical or sphere-like shape, which only represents an exemplary form in which the urea is used. Rather, the term pellet used herein includes, in general, grainy material which might be broken up just as well.

As a result of the mass production in large industrial plants for agricultural use, such urea may be available in large quantities as starting material, and may therefore be extremely cost-effective. Any size is basically possible as the setpoint size for the individual pellets. However, as the size of the pellets decreases, a finer gradation for dosing may be achieved. If the dimensions of the pellets otherwise used for fertilizing differs too greatly from the setpoint value hereof, simply passing the pellets through a screen may yield a suitable size fraction. An example size fraction includes pellets having deviations from the setpoint size in the range of about 5%. The setpoint size may have a diameter of, e.g., 1 to 3 mm.

However, it should be understood that example embodiments of the present invention are not limited to using urea in pellet form, but include, a device in which it is possible to supply these pellets from a storage vessel in a predefined dosing to the conversion process to ammonia. This takes place by isolating the pellets and subsequently passing them on to a carrier air stream, which performs the further transport. In this manner of proceeding, therefore, the smallest possible dosable unit quantity is determined by a pellet. By sequential isolation and subsequent transport of the pellets, a transport flow is produced in which the speed of the isolation and of the transport may be decisive for the dosing.

According to an example embodiment of the present invention, the isolation and supplying of the pellets to the carrier air stream may take place with the aid of a disk, ringwheel or a hollow cylinder section which has a plurality of receiving elements. By the rotation of the disk, ring wheel or the hollow cylinder section, the receiving elements are alternately brought into a position for filling and a position for blowing out. The rotational movement of the disk, ring wheel or the hollow cylinder section may be performed in a simple manner by a rotary drive, such as an electric motor. The change in dosing may take place, in this context, in a simple manner, by changing the rotary speed. This manner of proceeding may make possible a greatly dynamic situation by rotary speed changes, and may also be very simple and reliable. The direct influence of the rotary speed change on the dosing may lead to very short reaction times of the overall system.

An alternative to the disk shape or to the ring shape or to the hollow cylinder section is a slide-shaped portioning element that executes a to-and-fro swinging motion. Besides motor drives, whose rotational motion has to be converted to linear motion, a swinging electromagnet may also be possible as the drive.

In order to ensure that the pellets are supplied individually and one after the other to the carrier air stream, the receiving elements may be adjusted to the shape and the dimensions of the pellets such, in each case, only one pellet will fit into them.

For blowing out the pellets, according to an example embodiment of the present invention, the cross section of the blow-out opening may be formed to be larger than the receiving element, which may make blowing out the pellet easier.

An example embodiment of the present invention may provide that the transport line, in which a carrier air stream for transporting the pellets is produced, has a slightly bigger cross section than the maximum size of the pellets would require. In this manner, when transporting the pellets, the "blow-pipe" effect may be advantageous, e.g., in the transport tubing, the pellets form a kind of displaceable plug which almost completely fills the cross section of the transport tubing and thus closes it. The carrier air acting upstream generates an overpressure in the transport line which is the cause of the transport of the pellet in the transport line. This kind of transport may provide that bridge building by the material to be transported may be excluded. Furthermore, there may be no hovering of the material in the carrier air stream, since the carrier air stream pushes the pellet ahead of itself like an air cushion. In this manner one may successfully route the transport line both uphill and downhill in narrow windings without experiencing interferences or fluctuations in the dosing of the pellets.

In an example embodiment of the present invention, a portioning element may be partially covered by a baffle. In this context, the baffle takes on a scraper function and may thereby prevent jamming and squeezing the pellets during the isolation procedure. Additionally, the compressed air nozzle for the carrier air stream may be integrated into the baffle, so that the baffle takes care at the same time of sealing the carrier air stream to the inside of the container.

In an example embodiment of the present invention, as many receiving elements as possible may be provided on a circumferential line of the portioning element. This may provide that, for dosing, a slight rotational speed of the portioning element may be sufficient, and therefore filling the receiving elements may be managed with great certainty. The possible number of receiving elements may be determined by the radial distance of the receiving elements from the rotational axis and the mutual clearance from one another. The minimum mutual clearance of the receiving elements, according to an example embodiment of the present invention, may be greater than the diameter of the compressed air nozzle, so that one achieves that in each case only one receiving element has air pressure applied to it. It is also possible to select the clearance to be slightly smaller, so that, independently of the setting of the portioning element, a carrier air stream constantly prevails in the transport line.

An example embodiment of the present invention may provide forming the clearance of the receiving elements from one another greater than the diameter of the compressed air nozzle, and at the same time continuously to introduce air into the transport line at a location downstream from the compressed air nozzle. For this, for example, a part of the compressed air stream may be conducted upstream from the compressed air nozzle in a bypass line to the transport line. This may make certain that the pellets are blown out one after another from the receiving elements, and at the same time that there may take place a continuous carrying off in the carrier air stream. Thereby the efficiency and the operating safety of the device herein may be increased.

The pressure prevailing in the transport system may exceed the environmental pressure at the output location of the pellets from the transport line. This may provide that no air from the outside may get into the dosing device and the transport device, with which there may be connected the danger that moisture could penetrate the system from the outside. In the case of operating standstill, i.e., when the engine is shut down, a blocking element may additionally be present that takes over the function of air-tight cutting off from external influences.

The transport of the urea using an air stream or gas stream may provide that the urea is cooled during its transport and is protected from moisture. If necessary, only dry air is used for the carrier air stream, which is, for example generated in an air conditioning compressor.

Since, in the course of time, clogging of the receiving elements may not be completely excluded, according to an example embodiment, a cleaning mechanism for the receiving elements may be provided. The cleaning mechanism has one or more cleaning pins which, in the course of the movement of the portioning element, penetrate the just-emptied receiving elements, and in this context, push possibly remaining pellets or pellet remains from the receiving element. In this context, the cleaning pins may be located either supported at shiftable lengths and driven via a cam lobe on a shaft, or they may be located on a cleaning wheel uniformly distributed on the circumference and having a radial alignment.

Example embodiments of the present invention are described in greater detail below with reference to the appended Figures.

DETAILED DESCRIPTION

Figure 1:
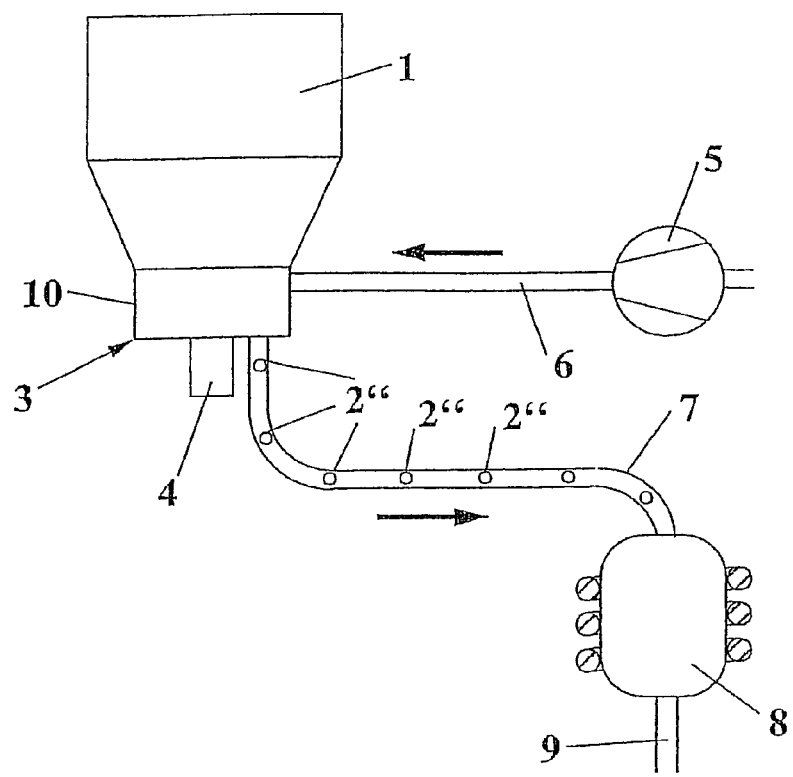
FIG. 1 is a schematic view of a dosing and transporting device according to an example embodiment of the present invention for carrying out the SCR method.
Figure 2:
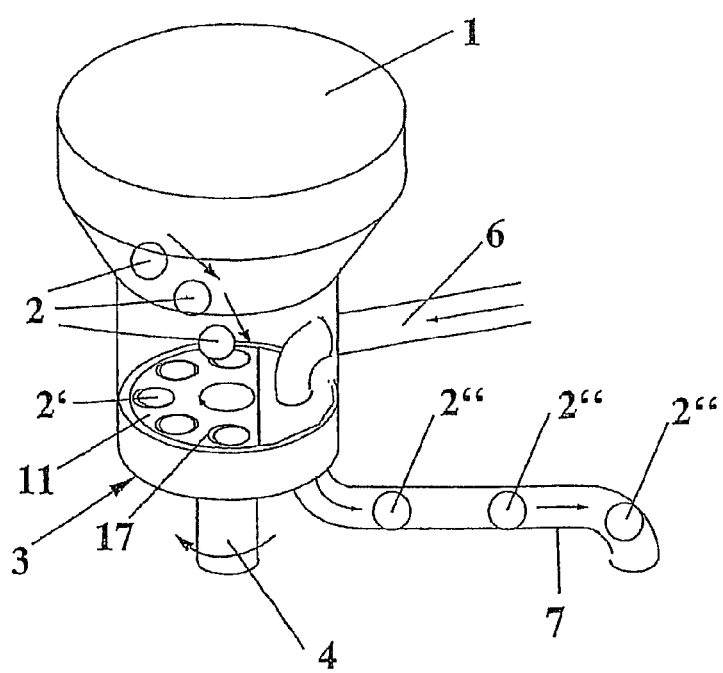
FIG. 2 is a perspective view of the storage vessel having the dosing device illustrated in FIG. 1.

FIGS. 1 and 2 schematically illustrate equipment for dosing and transporting dry urea for carrying out the SCR method. The equipment includes a storage vessel 1, which is used to store a large number of urea pellets 2. Storage vessel 1 has a cylindrical section in its upper part, which narrows, downwardly, in the shape of a funnel. At the lowest point on storage vessel 1, dosing device 3 is arranged. Dosing device 3 will be explained in greater detail with respect to FIGS. 3 and 4. Finally, on the lower side of dosing device 3 there is a motor 4 as the drive for dosing device 3.

Transporting pellets 2 from storage vessel 1 is done with the aid of a compressed air source 5, such as in the form of an air compressor, which is connected to dosing device 3 via pressure line 6. An additional pressure line 7, for transporting pellets 2, connects dosing device 3 with a reactor 8, in which the conversion of urea pellets 2 to ammonia takes place, due to the effect of heat. The generated ammonia is introduced via line 9 into the exhaust gas stream of an internal combustion engine.

Figure 3:
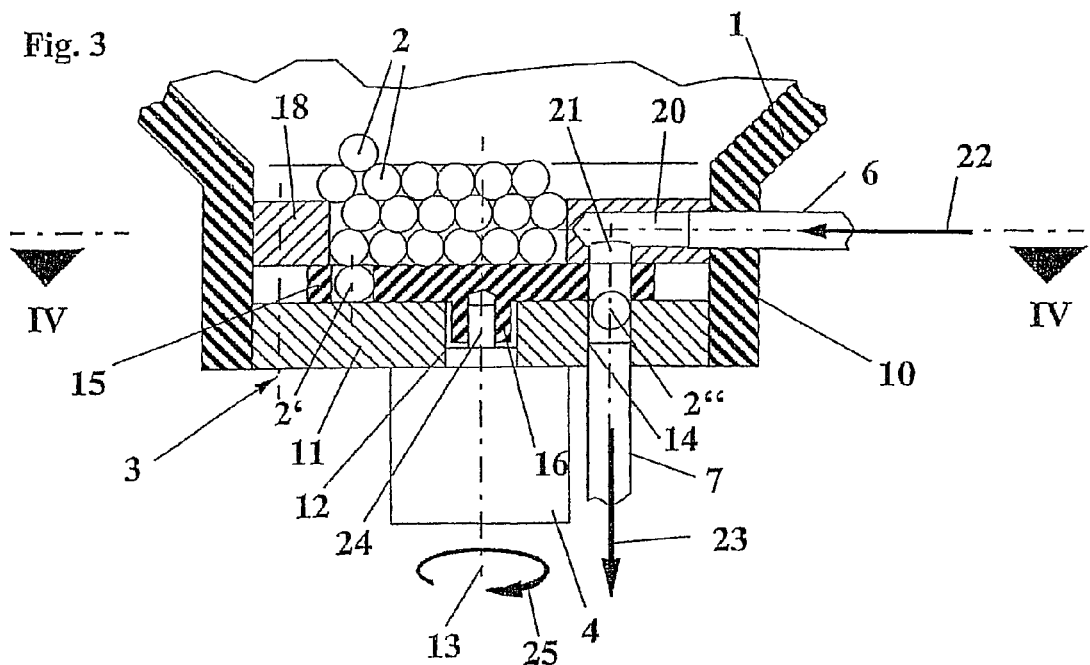
FIG. 3 is a vertical cross-sectional view through the bottom part of the storage vessel having the dosing and transporting device, taken along line III-III illustrated in FIG. 4.
Figure 4:
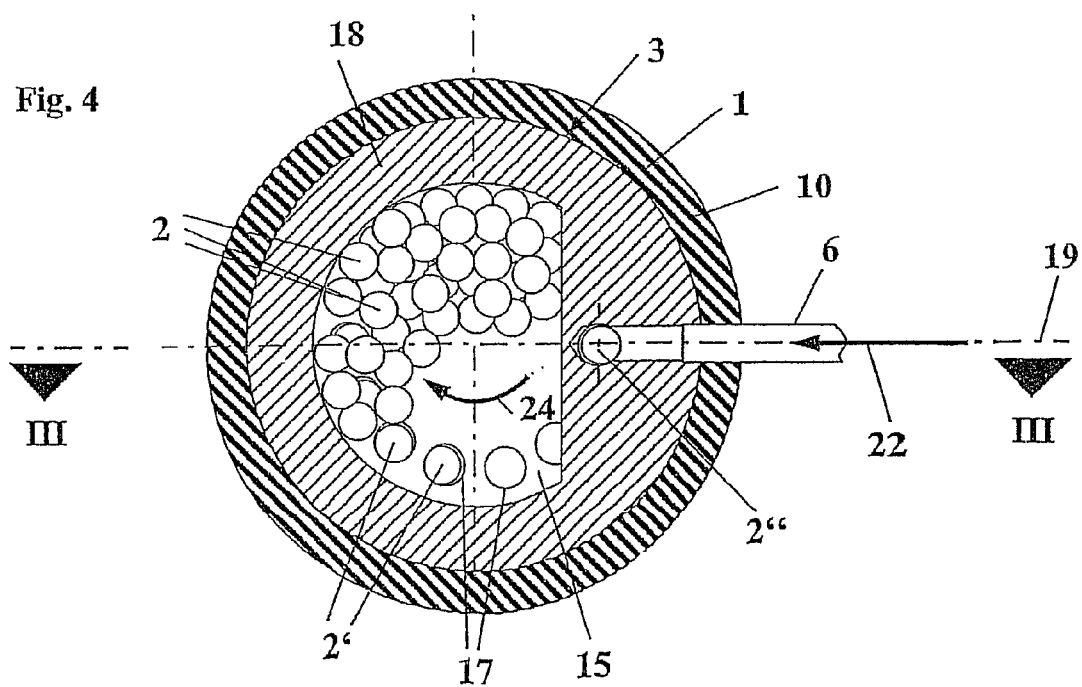
FIG. 4 is a horizontal cross-sectional view through the apparatus illustrated in FIG. 3 taken along the line IV-IV illustrated in FIG. 3.

FIGS. 3 and 4 illustrate dosing device 3 with parts of the transporting device. First is seen the lower, funnel-shaped part of storage vessel 1, which ends in a cylindrical extension 10. Cylindrical extension 10 surrounds, in a force- or non-positive-locking and gas-tight manner, dosing device 3, which forms the bottom of storage vessel 1.

Dosing device 3 has a circular disk 11, which closes flush with the lower edge of cylindrical extension 10. At its circle center a concentric circular opening 12 is provided. Axis of rotation 13 extends through the center, and perpendicular to the plane of circular disk 11. Eccentrically, approximately between the center and the edge of circular disk 11, a bore 14 goes through the disk element, with its axis parallel to axis of rotation 13.

Towards the inside of storage vessel 1, adjoining to circular disk 11, there is a plane-parallel and coaxially arranged portioning disk 15 which has at its lower side, facing circular disk 11, an extension 16 in the form of a short cylindrical piece, that extends from the middle of the lower side. Portioning disk 15 is located with extension 16 in opening 12, while maintaining a minimal play. In this context, circular disk 11 forms a sliding bearing for portioning disk 15, on which it is supported rotatably about axis of rotation 13.

Portioning disk 15 has a large number of parallel axis bores, which extend from the upper side of portioning disk 15 to its lower side, and which are situated uniformly distributed along a common circumferential line. Each of the bores forms a receiving element 17 for one pellet 2 in each case. The radial distance of receiving elements 17 from the axis of rotation 13 is equal to the radial distance of bore 14 from the center of circular disk 11, so that by turning portioning disk 15, receiving elements 17 may be brought one after another into a position aligned with bore 14.

Above portioning disk 15, a roughly ring-shaped baffle 18 is seen, that is also plane-parallel, which keeps such a great distance from circular disk 11 that portioning disk 15 is able to rotate within this space. The outer edge of baffle 18 adjoins the inner wall of cylindrical extension 10, and the inner edge, over the greatest part of its circumference, traces a concentric circle which, in axial projection, overlaps with the outer edge of portioning disk 15. In this context, however, receiving elements 17 remain freely accessible from the inside of vessel 1. Only in the area of bore 14 is baffle 18 enlarged segmentally, so that bore 14 is covered in a planar manner in portioning disk 15.

In the direction of axis of symmetry 19, there extends, both through extension 10 of storage vessel 1 and through baffle 18, a radial bore 20, which ends above bore 14 of portioning disk 15. Perpendicular to bore 20, an additional bore 21, that is parallel to axis of rotation 13, has been introduced into baffle 18, that is aligned with bore 14 in circular disk 11, and which forms a continuous channel with bore 20. In this manner, baffle 18 is used together with bores 20 and 21 to form a compressed air nozzle.

Pressure line 6, coming from pressure source 5, is connected to this bore 20. The compressed air stream is marked by arrow 22. Pressure line 7 is connected to bore 14 in circular disk 11, and it leads to reactor 8 (FIG. 1). The carrier air stream prevailing in pressure line 7 is marked by arrow 23.

The drive required for the rotation of portioning disk 15 is taken care of by a rotary speed-controlled electric motor 4, which is fastened to the lower side of circular disk 11, directly below opening 12, and whose drive shaft 24 penetrates in a form- or positive-locking manner into short cylindrical piece extension 16. The direction of rotation of portioning disk 15 is indicated by arrow 25.

During the operation of the motor vehicle, in order to carry out the SCR method, a certain quantity of ammonia is supplied to the exhaust gas stream, as a function of the respective load state of the internal combustion engine. According to an example embodiment of the present invention, the quantity of ammonia required is brought about by conversion of urea pellets 2 in reactor 8. In this context, in order constantly to supply reactor 8 with a sufficient quantity of urea, pellets 2 are supplied from a storage vessel 1, in the quantity that is required at any particular moment.

To do this, it may first be necessary to isolate pellets 2 that are present in bulk in storage vessel 1. Because of the force of gravity, lowest pellets 2 lie, making contact, on the upper side of portioning disk 15 that is surrounded by baffle 18 and is freely accessible. The isolation of the pellets takes place in that pellets 2 reach receiving elements 17 of portioning disk 15 as a result of their gravity. This process takes place along with the continuing rotation of portioning disk 15, in each case only one pellet 2 reaching receiving elements 17, as a result of the size of receiving elements 17. From here on, the pellets located in receiving elements 17 are marked 2'. The maximum speed of rotation of portioning disk 15 is limited because pellets 2 require a minimum of time to occupy receiving elements 17.

During the course of rotation of portioning disk 15, receiving elements 17 filled with pellets 2' are one after the other brought into a position in which their upper side lies opposite compressed air nozzle 18, 20, 21, and their lower side is aligned with bore 14. Since compressed air is applied to compressed air nozzle 18, 20, 21, pellets 2', upon reaching this position, are blown out of receiving element 17, and get into transport line 7. At this stage, the pellets are marked 2".

By the continuing rotation of portioning element 15, a receiving element 17, that has been blown out and is therefore empty, after passing through the region covered by baffle 18, arrives again at storage vessel 1 to be filled, while another receiving element 17, occupied by a pellet 2' is taken to compressed air nozzle 18, 20, 21, where the blowing out of next urea 2' takes place.

The individual receiving elements 17 in portioning disk 15 are separated by crosspiece regions of predetermined width. During the rotation, receiving elements 17 and crosspiece regions are alternatingly passed by compressed air nozzle 18, 20, 21, the crosspiece regions having the effect of interrupting compressed air stream 22. In this manner there is created an intermittent carrier air stream 23. By positioning there a bypass line, which connects pressure line 6 to transport line 7, an intermittent compressed air surge may be generated at the exit of nozzle 18, 20, 21, with continuous transport of pellets 2" in transport line 7.

This type of isolation has the effect that pellets 2' reach transport line 7 in a sequence in time, which leads to a spatial clearance of pellets 2" in transport line 7. By the adjustment of the internal diameter of transport line 7 to the dimensions of pellets 2, air cushions form in transport line 7 between two subsequent pellets 2" which are separated and limited by individual pellets 2", and between which, with respect to each other, no considerable air exchange takes place. One speaks here of a "blow-pipe effect", which may ensure that urea pellets 2" in transport line 7 maintain a predetermined clearance and do not bump into one another, which may subsequently cause bridge building and clogging. The size of the air cushion gives the clearance between two pellets 2" in line 7, and is a function of the air quantity that gets from receiving elements 17 to transport line 7 during and between the blowing out of two subsequent pellets. The air cushions push pellets 2" ahead of themselves, independently of the course of transport line 7, even any desired differences in height and curve radii being managed, until pellets 2" are finally fed into reactor 8.

The change in dosing of the urea is made via a rotary speed change of portioning disk 15. By increasing the rotational speed, pellets 2' get into transport line in a shorter sequence in time. By contrast, if the rotational speed is slowed down, a reduction in dosing may be achieved. In this manner, for example, without any problem, a dosing of 0 pellets per second to 40 pellets per second is possible, which is equal to a mass flow of 0 g per hour to approximately 600 g per hour. Since a rotary speed change of driving motor 4, and thus of portioning disk 15, leads directly to a change in dosing, an adaptation of the quantity of urea to changing load states of the internal combustion engine may be made very accurately and with great dynamism.

Since it may not be completely excluded that receiving elements 17 become partially or completely clogged in the course of time with pellets 2 or pellet remains, according to an example embodiment of the present invention, dosing device 3 is outfitted with a cleaning mechanism 26, which is post-connected to compressed air nozzle 18, 20, 21 in the direction of motion of portioning element 15, and which will be explained in more detail with reference to FIG. 5.

Figure 5:
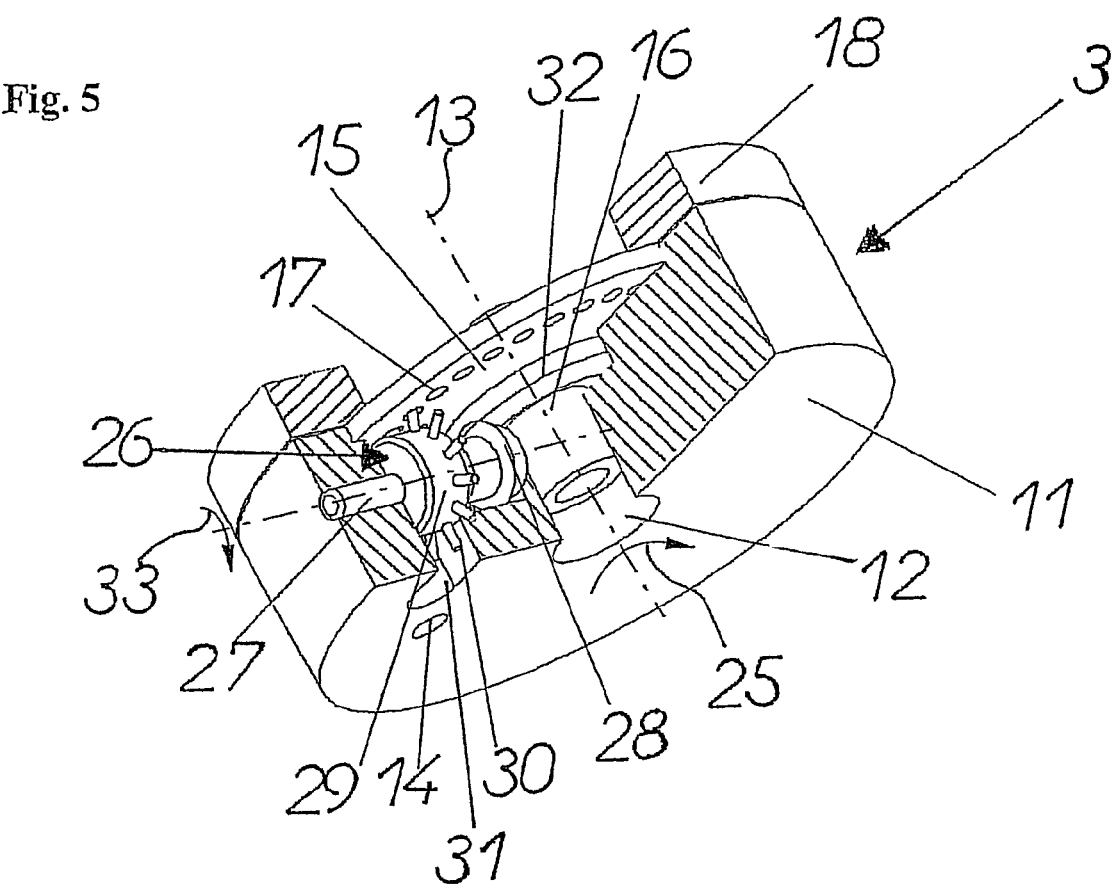
FIG. 5 is a perspective view of an example embodiment of the dosing device having an integrated cleaning mechanism.

Because of greater clarity, FIG. 5 illustrates only dosing device 3, without storage vessel 1, pressure lines 6 and 7 and drive motor 4. One may see portioning disk 15, having receiving elements 17, situated rotatably about axis of rotation 13, between circular disk 11 and baffle 18. From the lower side of portioning disk 15 there extends, centrally, short cylindrically shaped extension 16, which penetrates into opening 12 of circular disk 11. Short cylindrically shaped extension 16 is surrounded concentrically by a toothed rim 32, which is connected fixedly to the lower side of portioning disk 15, and which forms a part of an angle drive.

The other part of the angle drive includes drive shaft 27, which is supported, freely rotatable, in circular disk 11, below portioning disk 15, perpendicular to axis of rotation 13. At the inner end of drive shaft 27 there is a frustum-shaped pinion 28, whose teeth engage with toothed rim 32. In addition, on drive shaft 27, affixed with force-locking, there is a cleaning wheel 29 that is provided uniformly over its circumference with radially aligned cleaning pins 30. To accommodate drive shaft 27, pinion 28 and cleaning wheel 29, a corresponding hollow space is formed in circular disk 11 which is continued to the lower side of circular disk 11, and which forms an opening 31 there.

The arrangement of cleaning mechanism 26 within dosing device 3 is such that, with respect to the rotational movement 25 of receiving elements 17 it is postconnected to compressed air nozzle 18, 20, 21, and that the distance of cleaning wheel 29 from portioning disk 15 makes possible the penetration of receiving elements 17 by cleaning pins 30.

During the operation, described before, of the device according to an example embodiment of the present invention, the rotational movement 25 of portioning disk 15, initiated by drive motor 4 via toothed rim 32, is transmitted to pinion 28 and further on to drive shaft 27 and cleaning wheel 29. Consequently, rotational motion 25 of portioning disk 15 runs synchronously with rotational motion 33 of cleaning wheel 29 having the cleaning pins situated on it. By the suitable arrangement of cleaning pins 30 on cleaning wheel 29, in this context, in each case a cleaning pin 30 engages with a receiving element 17, and possibly lifts pellets 2' or pellet remains that may be present out of receiving element 17. Urea particles that appear in this context, because of gravity, fall through opening 31 and out of dosing device 3. In this manner it may be permanently ensured that there are always available empty receiving elements 17 for the isolation and dosing of pellets 2 that are located in storage vessel 1.

What is claimed is:

1. A device for dosing and transporting dry urea, comprising:
   a storage vessel adapted to store dry urea in the form of pellets, a wall of the storage vessel having an opening to which a transport line is connected from outside;
   a compressed air nozzle arranged inside the storage vessel at a distance from the opening and aligned with the opening; and a portioning element having an upper side pointing to the inside of the storage vessel and a lower side arranged opposite to the wall of the storage vessel, at least one continuous channel having a cross-section greater than dimensions of the pellets connecting the upper side and the lower side arranged to form at least one receiving element for the pellets, the portioning element movably supported between the compressed air nozzle and the wall of the storage vessel to alternatingly be brought from one position in which the receiving elements are freely accessible from the upper side of the portioning element into a position in which the receiving elements are arranged in an aligned manner between the compressed air nozzle and the opening.

2. The device according to claim 1, wherein the device is adapted to perform an SCR method in a motor vehicle.

3. The device according to claim 1, wherein the pellets have a setpoint size one of (a) in diameter and (b) diagonally of 2 to 3 mm.

4. The device according to claim 1, wherein the pellets have a setpoint size one of (a) in diameter and (b) diagonally of 1.9 mm.

5. The device according to claim 1, wherein the receiving elements have a depth and cross-section adapted to accommodate a pellet.

6. The device according to claim 1, wherein the receiving elements have a minimum mutual clearance greater than an exit diameter of the compressed air nozzle.

7. The device according to claim 1, wherein the transport line includes a connection to an introduction of compressed air.

8. The device according to claim 1, wherein a compressed air line upstream of the compressed air nozzle and the transport line downstream of the compressed air nozzle are connected by a bypass line.

9. The device according to claim 1, wherein the receiving elements have a minimum mutual clearance that is smaller than an exit diameter of the compressed air nozzle.

10. The device according to claim 1, wherein the opening in the wall of the vessel has a cross-section that is at least a same size as a cross-section of the receiving elements.

11. The device according to claim 1, wherein the opening in the wall of the vessel has a cross-section that is greater than a cross-section of the receiving elements.

12. The device according to claim 1, wherein the transport line has an unobstructed cross-section that is larger than a maximum dimension of the pellets.

13. The device according to claim 1, wherein pressure in the transport line is greater than environmental pressure.

14. The device according to claim 1, wherein pressure in the transport line is greater than environmental pressure by 0.1 to 1.0 bar.

15. The device according to claim 1, wherein pressure in the transport line is greater than environmental pressure by at least 0.5 bar.

16. The device according to claim 1, wherein the portioning element includes one of (a) a disk, (b) an annular disk and (c) a hollow cylinder section supported rotatable between the compressed air nozzle and the wall of the storage vessel.

17. The device according to claim 16, wherein the portioning element includes a plurality of one of (a) axially parallel receiving elements and (b) radial receiving elements arranged on one circumferential line and having a same clearance between one another.

18. The device according to claim 16, wherein the receiving elements are arranged at a radial distance from an axis of rotation.

19. The device according to claim 16, wherein a speed of rotation of portioning element is variable to set and change the dosing.

20. The device according to claim 1, wherein the portioning element includes a slide movable back and forth along a linear guideway.

21. The device according to claim 20, wherein the receiving elements are arranged parallel to a direction of motion of the slide.

22. The device according to claim 20, wherein the slide is driven electromagnetically.

23. The device according to claim 1, wherein the pellets have a setpoint size one of (a) in diameter and (b) diagonally of 1 to 5 mm.

24. The device according to claim 23, wherein deviations of the pellets from the setpoint size are less than 10%.

25. The device according to claim 23, wherein deviations of the pellets from the setpoint size are less than 5%.

26. The device according to claim 1, wherein upper side edges of the portioning element are covered by a baffle.

27. The device according to claim 26, wherein the compressed air nozzle is integrated into the baffle.

28. The device according to claim 1, further comprising a cleaning unit postconnected to the compressed air nozzle and adapted to free the receiving elements from urea remains.

29. The device according to claim 28, wherein the cleaning unit includes at least one cleaning pin adapted to penetrate through the receiving elements.

30. The device according to claim 29, wherein the cleaning pin is supported and activated transversely to a plane of the portioning element in a longitudinally shiftable manner.

31. The device according to claim 29, wherein the cleaning pin is arranged in radial alignment about a drive shaft that extends parallel to a plane of the portioning element and transversely to a direction of motion of the receiving elements, the cleaning pin adapted to penetrate through the receiving elements during rotation.

32. The device according to claim 29, wherein motion of the cleaning pin is coupled to motion of the portioning elements.

33. The device according to claim 31, wherein the portioning element is connected to the drive shaft via an angle drive.

* * * * *